United States Patent [19]

McMullin

[11] Patent Number: 4,599,724
[45] Date of Patent: Jul. 8, 1986

[54] QUADRUPOLE-MAGNETIC-PUMP-FIELD FREE ELECTRON LASER

[75] Inventor: Wayne A. McMullin, Chatworth, Calif.

[73] Assignee: Rockwell International Corporation, El Segundo, Calif.

[21] Appl. No.: 670,237

[22] Filed: Nov. 13, 1984

[51] Int. Cl.$^4$ .............................................. H01S 3/00
[52] U.S. Cl. .......................................... 372/2; 372/37; 315/4; 315/5
[58] Field of Search ...................... 372/2, 37; 315/4, 5, 315/5.41, 5.42

[56] References Cited

U.S. PATENT DOCUMENTS

| | | | |
|---|---|---|---|
| 4,283,687 | 8/1981 | Madey et al. | 372/2 |
| 4,425,649 | 1/1984 | Elias et al. | 372/2 |
| 4,449,219 | 4/1984 | Smith et al. | 372/2 |
| 4,479,219 | 10/1984 | Madey | 372/2 |

OTHER PUBLICATIONS

Halbach; "Permanent Multiple Magnets with Adjustable Strength"; *IEEE Trans. on Nucl. Sci.*, vol. NS-30, No. 4, Aug. '83, pp. 3323-3325.

Primary Examiner—Léon Scott, Jr.
Attorney, Agent, or Firm—H. Frederick Hamann; Harry B. Field; Lawrence N. Ginsberg

[57] ABSTRACT

A free electron laser in which the electron beam 12 is sent through the field of a quadrupole magnet 16 which may be untapered or tapered. The beam 12 is sent through the magnet 16 spaced from the symmetry axis of the magnet's poles 22 but on the focusing plane 20 of the quadrupole magnet 16.

7 Claims, 5 Drawing Figures

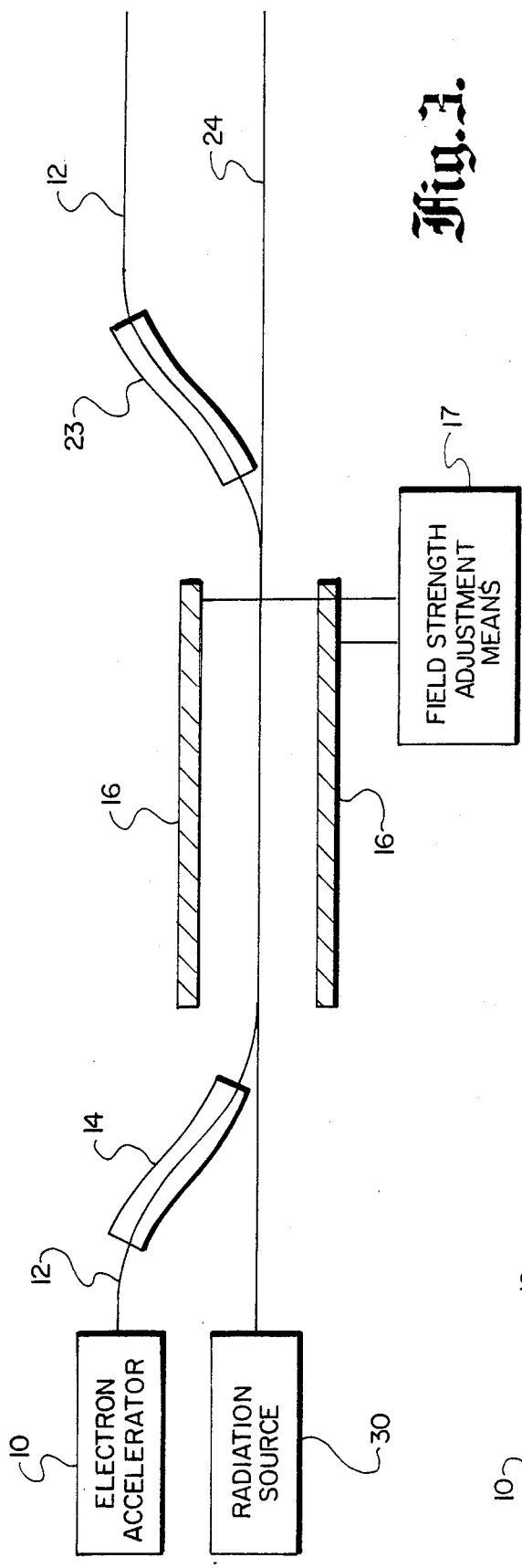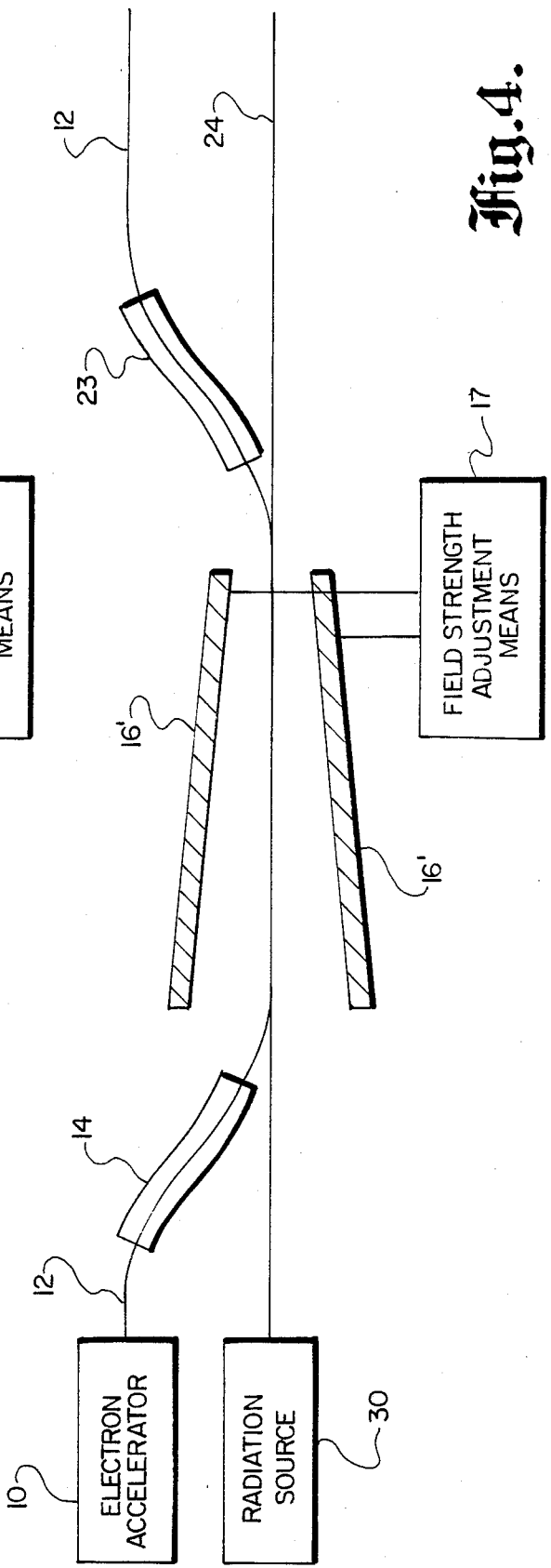

QUADRUPOLE-MAGNETIC-PUMP-FIELD FREE ELECTRON LASER

BACKGROUND OF THE INVENTION

1. Field of the Invention

This invention relates to free electron lasers and especially to a tunable-frequency, free electron laser.

2. Description of this Prior Art

Previous free electron lasers, i.e., lasers using a beam of relativistic electrons for generating coherent radiation in the centimeter, millimeter, infrared, optical, ultraviolet and X-ray regions of the electromagnetic spectrum, utilize periodic deflection of the transverse periodic magnetic field produced by a linear array of magnets (e.g., see U.S. Pat. No. 3,822,410 granted to J. M. J. Madey on July 2, 1974). The patent shows a laser device which is tunable in frequency by changing the strength, B, of the magnetic field. However, the range of tunability is rather narrow in response to changes in magnetic field strength.

OBJECTS OF THE INVENTION

An object of the invention is to improve the tunability range of free electron lasers.

Another object is to provide magnetic field means for a free electron laser, which means is easier to construct than the magnetic field means used in previous free electron lasers (as exemplified by Madey's device).

Other objects, advantages and novel features of the present invention will become apparent from the following detailed description of the invention when considered in conjunction with the accompanying drawing.

SUMMARY OF THE INVENTION

The objects and advantages of the present invention are achieved by the use of a quadrupole magnet to deflect the electron beam and thereby generate coherent electromagnetic radiation. The use of a quadrupole magnet in place of a plurality of individual magnets which produce a d.c. periodic magnetic field results in a much greater frequency tunability range and easier constructability which, in turn, provides a less expensive device.

BRIEF DESCRIPTION OF THE FIGURES

FIG. 3 is a schematic diagram of another embodiment of the invention.

FIG. 4 is a schematic diagram of an embodiment of the invention which uses tapered poles in the quadrupole magnet.

The same elements or parts throughout the figures of the drawing are designated by the same reference characters, while equivalent elements bear a prime designation.

DETAILED DESCRIPTION OF THE PREFERRED EMBODIMENT

Figure 1:
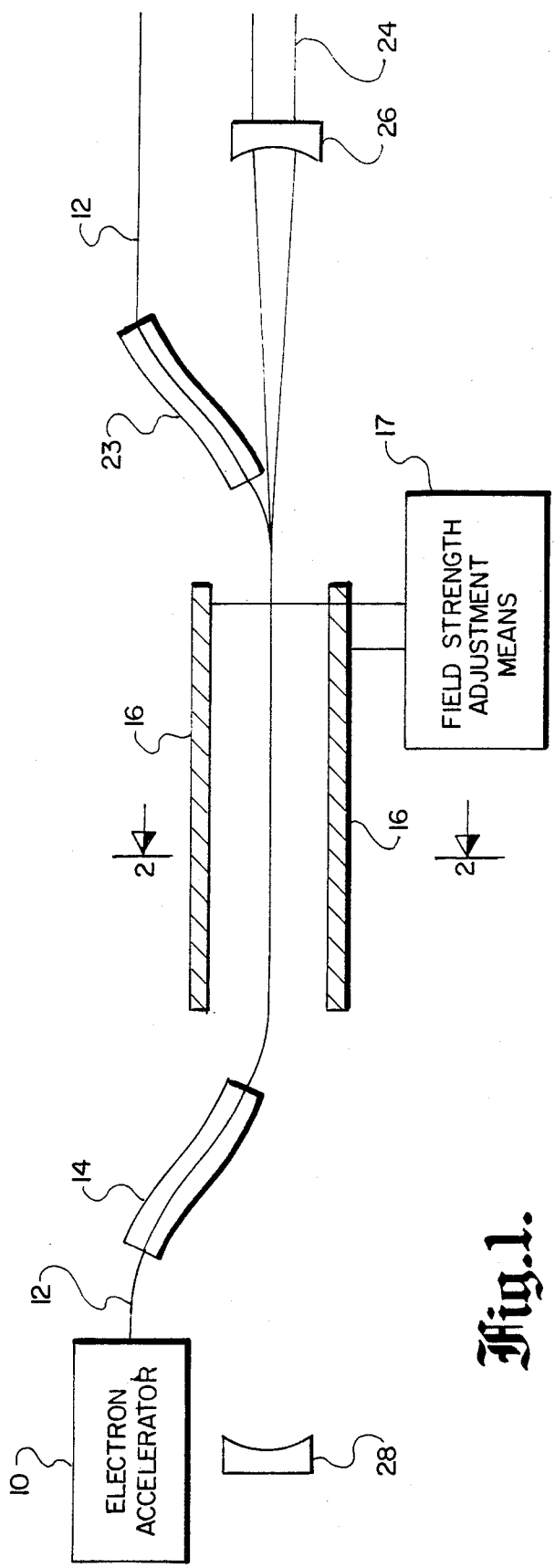
FIG. 1 is a schematic diagram of an embodiment of the invention.
Figure 2:
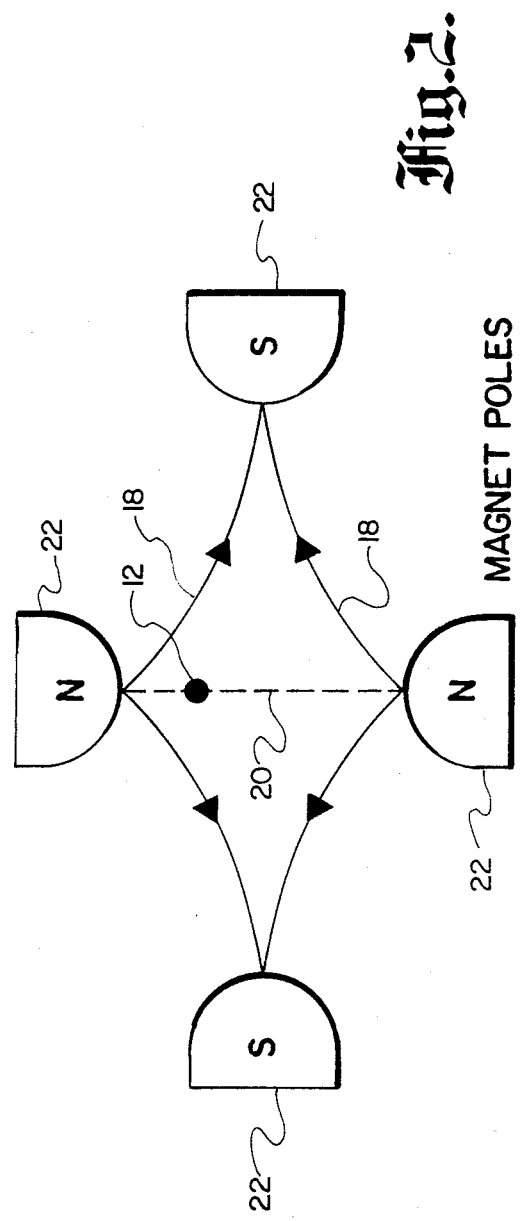
FIG. 2 is a cross-section taken thru the poles of the quadrupole magnet.

FIG. 1 schematically shows an embodiment of the invention. An electron accelerator 10 provides a relativistic beam 12 of electrons of energy $E = \gamma mc^2$, where $$\gamma = \frac{1}{\sqrt{1 - v^2/c^2}},$$

v is the axial electron velocity, and c is the speed of light. The beam 12 is sent through an injection magnet 14 which bends the beam 12 so that it passes through the field of a quadrupole magnet 16. An end view of the quadrupole magnet 16 and some magnetic field lines 18 is shown schematically in FIG. 2. The path of the electron beam 12 is indicated by a dot, that is, the beam path is off-axis and the beam is coming toward the observer. The path of the electron beam 12 is in the focusing plane 20 of the magnet 16. The beam 12 travels parallel to but off the symmetry axis of the magnet 16 in the focusing plane 20 of the magnet. The quadrupole magnet 16 accelerates the electrons periodically in the direction transverse to the symmetry axis, which is in the center of the magnetic poles 22. The periodic acceleration causes the electrons to spontaneously emit linearly polarized radiation that travels in the same direction as the electron beam 12. The wavelength of the spontaneous radiation is given by $$\gamma = \sqrt{\frac{m}{e\alpha B_o}} \; \frac{2\pi c}{s\gamma^{3/2}(1 + v/c)}$$

where e is the charge on an electron, $\alpha B_o$ is the magnetic field gradient and s is a harmonic number of value 1, 3, 5, 7, . . . . The wavelength (or frequency) of the emitted radiation can be changed by varying $\gamma$ (which is changed by varying the electron velocity v), the harmonic number s (which is varied by changing the mirror spacing), or, preferably, by varying $B_o$ the strength of the magnetic field. The strength of the magnetic field may be varied by changing the magnitude of the electric current if the quadrupole magnet is an electromagnet or by rotating the outer soft iron ring of a quadrupole magnet if the poles are permanent magnets. (For example, see Halbach, "Permanent Multipole Magnets With Adjustable Strength", IEEE Transactions on Nuclear Science, Vol. N5-30, No. 4, August 1983). The field-strength adjustment means 17 is indicated schematically by a box in FIGS. 1, 3 and 4.

After the electrons have passed through the quadrupole magnet 16, they pass through an extraction magnet 23 which separates the electrons from the radiation beam 24.

If the device is to be operated as an oscillator, as in FIG. 1, a mirror 26 is placed in the path of the radiation beam 24 to reflect part of the radiation back to another mirror 28. The beam is reflected back and forth causing stimulated emission to occur. The stimulated emission has the same polarization, frequency and wavenumber as the spontaneous emission and is coherent. The device can also be operated as an amplifier as shown in FIG. 3 by omitting the mirrors 26, 28 and by using a radiation source 30 to inject into the interaction region radiation of the same polarization, frequency and wavenumber as the spontaneous emission. The external radiation passes through the interaction region causing stimulated emission there and the output radiation is amplified, coherent radiation.

The quadrupole magnet 16 can be made of permanent magnetic material or it can be an electromagnet. The poles 22 remain equidistant from each other throughout the length of the magnet 16. With this configuration, the device can operate at radiation output powers of kilowatts or megawatts and at an efficiency of about 1%.

Figure 5:
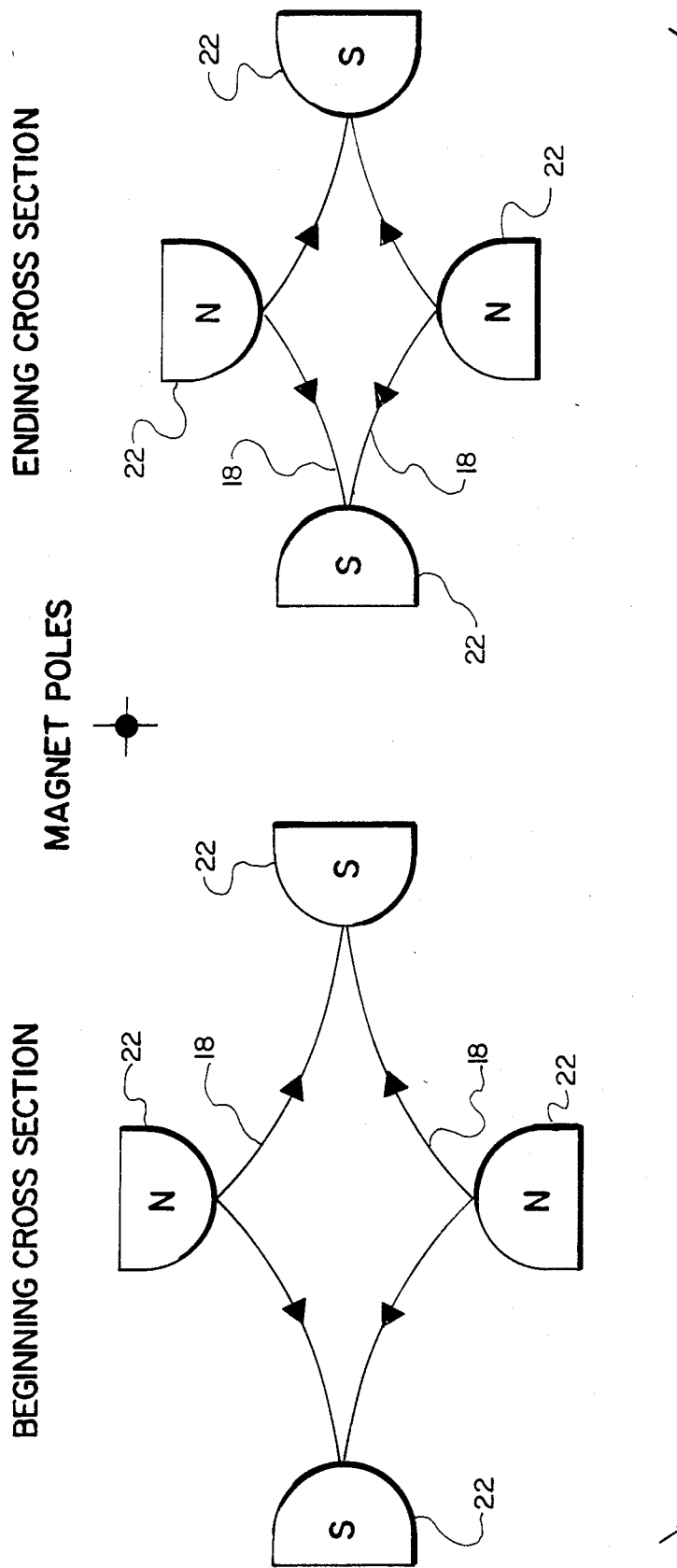
FIG. 5 is a cross-section taken thru the poles of the quadrupole magnet at its upstream end and at its downstream end.

For the oscillator or amplifier to operate at gigawatt power levels and efficiencies higher than 1%, the quadrupole magnet 16 can be tapered as shown by poles 16' toward the output end as shown in FIGS. 4 and 5. The quadrupole magnetic field amplitude, $B_o$, slowly increases along the axial direction because of the increasing closeness of the poles 22. Electrons traveling in the tapered quadrupole magnetic field yield more of their energy to the radiation field than in the untapered quadrupole field with the consequence that higher efficiencies are attained.

The present device tunes the output radiation frequency over a wide range by changing the strength, $B_o$, of the magnetic field without drastically affecting the gain, as in previous free electron lasers. Changing frequency by changing electron speed in previous free electron lasers also drastically affects the gain of the laser. The wavelength of Madey's laser is given by $$\lambda_f = \frac{\lambda_q}{2\gamma^2} [1 + (\tfrac{1}{2})(\lambda_q/4c)^2 (eB_o/mc)^2]$$

where $\alpha_q$ is the magnet field spacing and m is the particle rest mass. The gain is given by a rather long expression which will not be reproduced here but can be obtained from Madey's patent.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A free electron laser including magnetic means forming an interaction region where spontaneous emission from the electron beam is passed through an oscillator resulting in a coherently amplified output and wherein:
said magnetic means comprises a quadrupole magnet.
2. A laser as in claim 1, including:
means for directing the electron beam parallel to but off-axis from the symmetry axis of the quadrupole magnet.
3. A laser as in claim 1, wherein:
pole pieces of said quadrupole magnet are tapered in an axial direction toward a downstream end so that the cross-sectional area between the poles at the downstream end is smaller than the cross-sectional area between the poles at an upstream end.
4. A laser as in claim 1, including:
means for adjusting the field strength of the quadrupole magnet so that the frequency of coherent radiation emitted by the electron beam may be varied.
5. A laser as in claim 3, including:
means for adjusting the field strength of the quadrupole magnet so that the frequency of coherent radiation emitted by the electron beam may be varied.
6. A free electron laser including magnetic means forming an interaction region through which external radiation and an electron beam pass causing stimulated emission such that resulting output radiation is coherent and amplified and wherein said magnetic means comprises a quadrupole magnet.
7. A laser as in claim 6 including means for adjusting the field strength of the quadrupole magnet so that the frequency of coherent radiation emitted by the electron beam may be varied.

* * * * *

UNITED STATES PATENT AND TRADEMARK OFFICE
CERTIFICATE OF CORRECTION

PATENT NO. : 4,599,724

DATED : July 8, 1986

INVENTOR(S) : Wayne A. McMullin

It is certified that error appears in the above-identified patent and that said Letters Patent is hereby corrected as shown below:

Column 4, line 11, after "1" insert --or 6--.

line 15, after "1" insert --or 6--.

line 21, after "1" insert --or 6--.

Signed and Sealed this

Twenty-third Day of September 1986

[SEAL]

Attest:

DONALD J. QUIGG

Attesting Officer

Commissioner of Patents and Trademarks